June 11, 1935.　　　C. FANFARILLO　　　2,004,276
PAN FOR CEMENT MIXERS
Filed Aug. 11, 1932　　　3 Sheets-Sheet 1

Inventor
Cesare Fanfarillo
By W. W. Williamson
Atty.

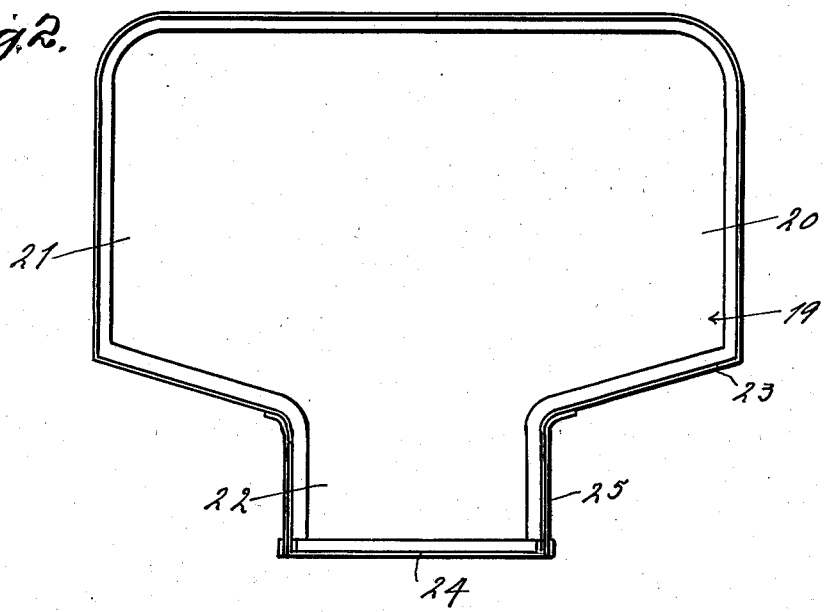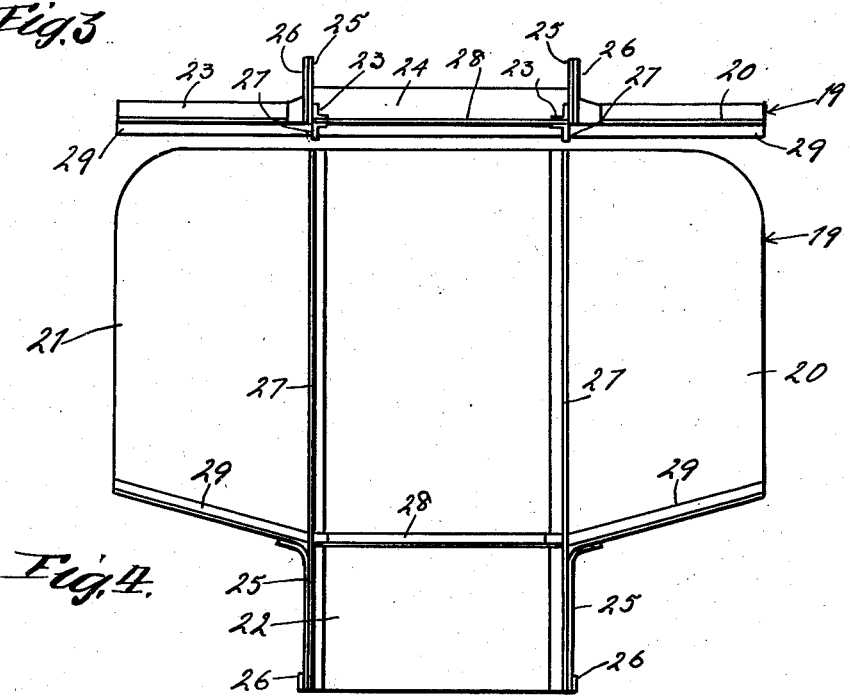

June 11, 1935.  C. FANFARILLO  2,004,276
PAN FOR CEMENT MIXERS
Filed Aug. 11, 1932  3 Sheets-Sheet 3
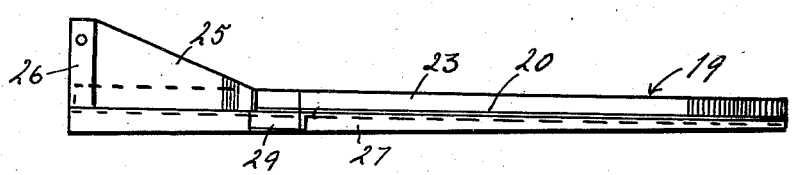
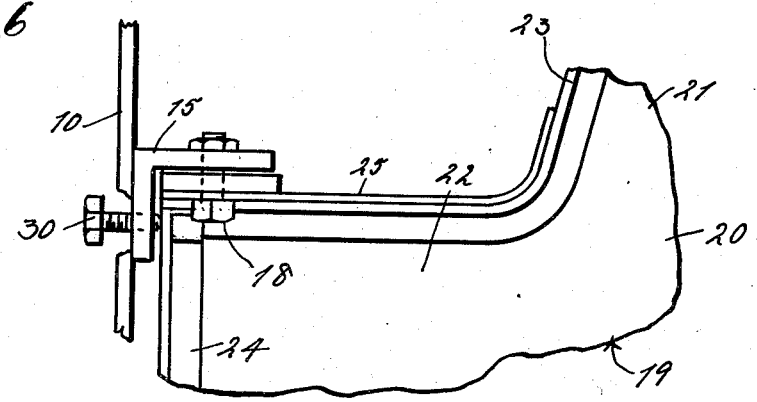
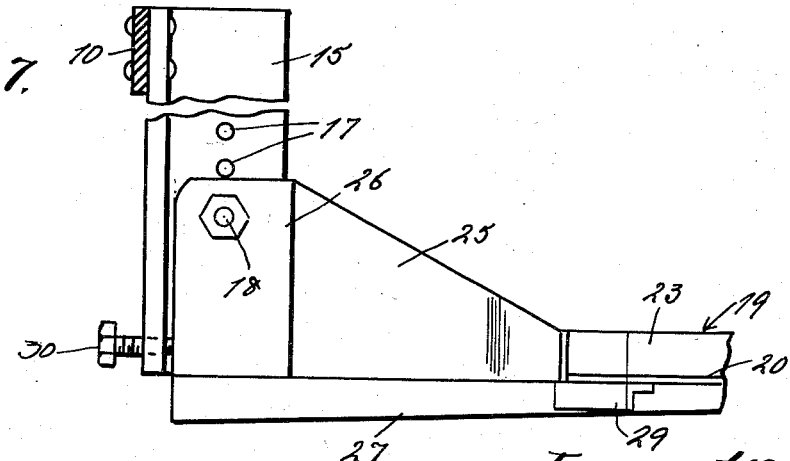
Inventor
Cesare Fanfarillo
By Williamson
Atty.

Patented June 11, 1935

2,004,276

UNITED STATES PATENT OFFICE 2,004,276

PAN FOR CEMENT MIXERS

Cesare Fanfarillo, Glassboro, N. J.

Application August 11, 1932, Serial No. 628,337

5 Claims. (Cl. 83—73)

My invention relates to new and useful improvements in a pan for cement mixers, and has for one of its objects to provide a device of this character which may be directly attached to a cement mixer and needs no special attention while in use.

Another object of the invention is to provide a pan for adjustable connection to a cement mixing machine whereby drippings from the spout or bucket will be intercepted before reaching the finished or partly finished work on which the machine is resting.

Another object of the invention is to provide means for adjustably and hingedly mounting the pan on a cement mixing machine whereby it may be adjusted vertically for the accommodation of certain classes of work and the position of the bucket above said pan and whereby it may be moved to different angular operative positions as well as to an inoperative position.

Another object of the invention is to provide a pan of the class described of unique form and construction.

Another object of the invention is to provide a pan which is directly attached to the mixing machine in order to move therewith, said pan having means to cause it to slide over obstructions on the roadway.

A further object of the invention is to provide a pan to be carried by the mixer at a position beneath the spout and below the location of the bucket when the latter is being filled so that said pan catches all drip from the mixer and bucket, so that it may be replaced in the mixer or shoveled into the bucket, thereby providing a considerable saving in material which is usually lost. In addition to the saving of material, there is also a considerable saving in labor where the device is used in connection with a mixer on road work because it eliminates the undesirable accumulation of cement on the concrete road bed which must be removed prior to said road bed being covered with the final smooth coating of cement.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 2 is an enlarged top plan view of the pan per se.

Fig. 3 is an inner end view thereof.

Fig. 4 is a bottom plan view of the same.

Fig. 5 is a side elevation thereof.

Fig. 6 is a further enlarged fragmentary top plan view of the pan and one of its supports showing the connection for hingedly and adjustably mounting the pan.

Fig. 7 is a fragmentary side elevation of the pan for showing its connection with the hangers with the near side hanger removed.

Figure 1:
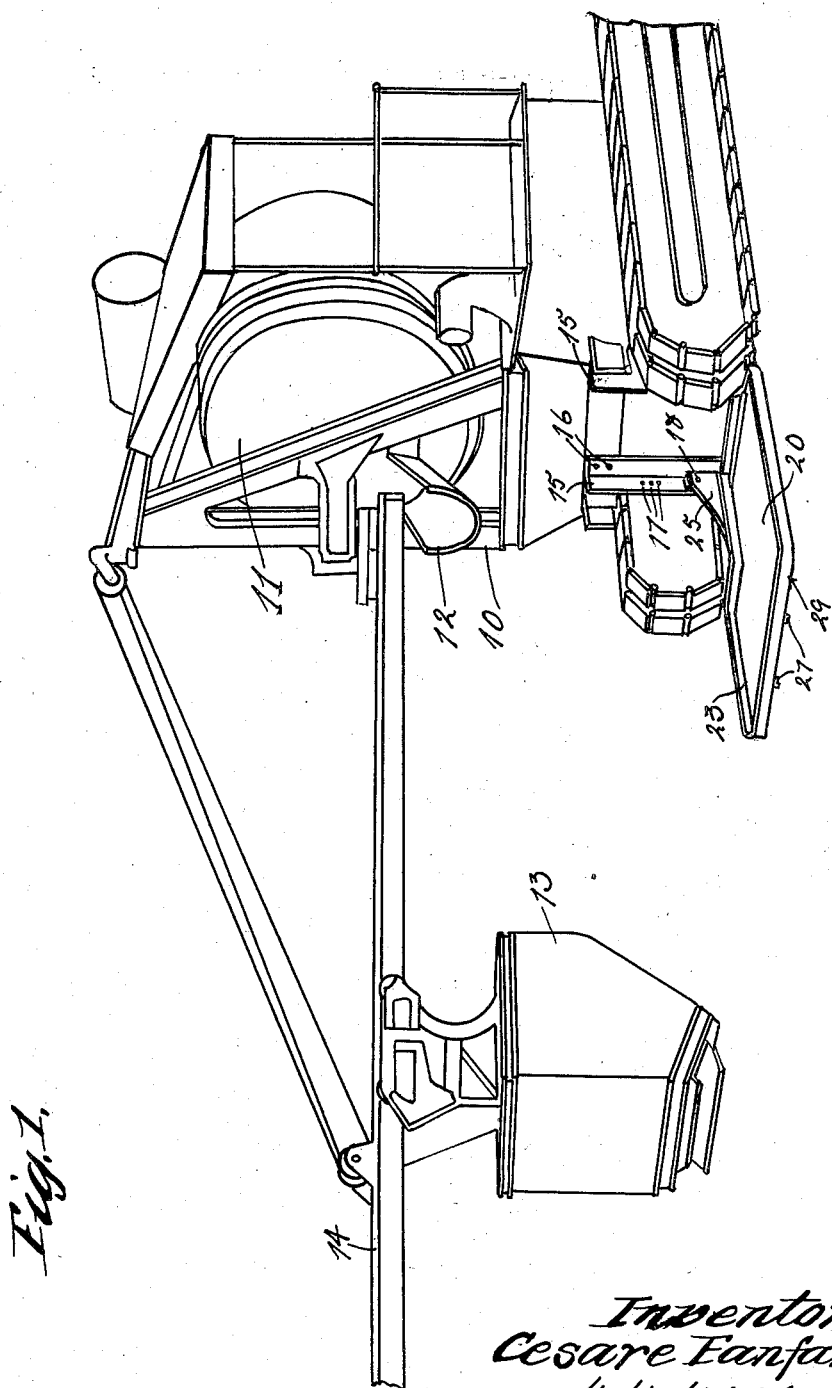
Fig. 1 is a fragmentary perspective view of a conventional cement mixer showing my invention applied thereto.

In carrying out my invention as herein embodied, 10 represents a cement mixing machine of any usual or well known construction including a mixing drum 11 in which the materials are mixed and then allowed to run out over or through the spout 12 into any suitable receptacle such as a bucket 13 supported on any suitable crane 14. In the particular conventionally illustrated mixer herewith shown, the bucket 13 is moved in and out on a boom and is moved back beneath the outer end of the spout 12 when said bucket is to be filled with the cementitious material coming from the mixing drum.

On some suitable part of the mixing machine below the spout 12 are fixed suitable angle iron hangers 15 by means of bolts 16 or equivalent fastening devices.

There are a pair of these hangers and they are mounted so that one flange of each projects inwardly or toward the other hanger and the flanges by which the hangers are fastened to the machine have any desirable number of holes whereby they may be used in connection with different machines in which the supporting elements for the hangers vary in height from the ground or tread base of the machine.

The other or outwardly projecting or free flanges of the hangers have a number of holes 17 in vertically spaced relation for the reception of pintle bolts 18 for hingedly supporting the pan 19 in any desirable vertical adjustment.

The pan 19 includes a flat bottom wall 20 fashioned to provide a wide body portion 21 and a reduced neck 22 at the rear whereby recesses are provided at each side of the neck to the rear of the body for the accommodation of caterpillar treads, wheels and the like, and the rear edges of the body 21 of the pan between the side edges of said body and the side edges of the neck are preferably angular or extend in oblique directions inwardly and rearwardly from the side edges of said body.

On the top face of the pan bottom around the edges thereof, with the exception of the rear edge of the neck, is disposed an angle iron rim 23 and one of the flanges of said angle iron rim is fixed to the top face of the bottom wall in any suitable manner as by riveting or welding. An angle iron rim 24 is also provided across the rear edge of the neck portion of the pan bottom but the upstanding flange thereof is preferably higher than the upstanding flange of the rim 23 because when shoveling material out of the pan, said material is generally forced toward and into the neck portion and therefore is likely to be piled up to a greater height than when seeking its level over the entire pan.

In order to increase the height of the rim or sides of the pan in the region of the neck, angular side plates 25 are secured to the rim 23 at both sides of the neck and extend from the extreme rear end or edge of said neck along the sides of said neck and short distances on to the oblique rear edges of the pan body as plainly shown in Figs. 2 and 6, and on the outer faces of said side plates at the rear ends are mounted vertical strengthening strips 26 and the pintle bolts 18 pass through said strengthening strips and side plates, thereby hingedly connecting the pan to the hangers 15 whereby the outer end of the pan may be raised or lowered as desired. By turning the pan up until it is in a substantially vertical position, it will be out of the way when the mixing machine is being transported from place to place.

On the under surface of the bottom of the pan are two parallel longitudinal runners 27 which are preferably spaced apart a distance equal to the width of the neck so that the downwardly projecting flanges thereof are practically in alignment with the side edges of said neck and the other flanges project toward each other as shown in Fig. 4. The bottom edges of these runners are beveled or inclined upwardly from their inner toward their outer ends as illustrated in Fig. 5, so that if the pan strikes a high spot or an obstruction in its path of travel, it will ride over the obstruction without injury to the bottom of the pan.

The said runners 27 also strengthen the pan and help to stiffen the same lengthwise thereof and in order that said pan may also be strengthened or stiffened transversely, an angle iron rib 28 is secured to the bottom face of the pan bottom between the runners and other angle iron ribs 29 are secured to the bottom face of the pan bottom between the runners and the outer edges of the body of the pan as shown in Fig. 4.

When it is desired to slightly elevate the pan and more particularly the outer end thereof, this may be accomplished through the medium of the set screws 30 having threaded connection with the inwardly projecting or fixed flanges of the hangers 15, the said set screws 30 passing through the hanger flanges and impinging against the rear of the pan at points below the pintle bolts 18. By screwing in on the set screws 30, the pan will be swung upwardly any desirable distance within the limits of the screws and by reversing said action, the pan will be lowered and therefore said pan can be adjusted so that the bucket will just clear the rim thereof and place the pan in such close proximity to the bottom of the bucket that very little splashing will occur from the material running out of the bucket and falling on to the pan.

With a pan such as herein described in position as shown in Fig 1, any of the cementitious material dropping from the bucket, either through the cracks in the dump bottom or running over the upper edge, as the same is being filled, or any of the material which may be splashed about during the filling of the bucket, or that may drip from the spout after the bucket has been removed from beneath, the latter will drop or run into the pan, and therefore, will not reach the finished or partly finished work and can be removed from the pan at any time and shoveled into place or into the bucket or replaced in the mixer, thereby providing savings in time, labor and material.

Of course I do not wish to be limited to the exact details of construction as herein shown, as these may be varied within the limits of the appended claims without departing from the spirit of my invention.

Having thus fully described my invention what I claim as new and useful is:—

1. In combination with a cement mixing machine including a delivery spout leading from a mixing drum and a conveyor bucket to be filled from said spout when the former is disposed beneath the latter, hangers attached to the machine and including inturned flanges through which suitable fastening means pass for securing the hangers in place and further provided with outwardly projecting flanges with rows of vertically spaced holes adjacent their lower ends, a pan having a wide body portion and a restricted neck for projection between the outwardly projecting flanges of the hangers, means passing through suitable portions of the rear end of the pan and through any of the holes in the outwardly projecting flanges for hingedly connecting the pan in any vertical adjustment to the hangers and set screws having threaded connection with the inturned flanges of the hangers and engaging the rear portion of the pan below the hinge points for tilting the pan into any desired position.

2. The structure set forth in claim 1 in combination, with runners mounted on the bottom of the pan longitudinally thereof and having their bottom edges inclined upwardly toward the outer end of the pan.

3. A device of the kind described including a pan body, a pan neck, an upstanding rim formed from angle irons surrounding the edges of the body and neck, side plates secured to the side rims of the neck, vertical strengthening strips disposed over the outer faces of the plates adjacent their rear edges and runners disposed in parellelism on the underside of the pan body and neck.

4. The structure set forth in claim 3 in combination, with ribs disposed transversely on the underside of the pan body adjacent its inner edges and across the imaginary line of meeting between the pan body and neck.

5. A pan for cement mixers comprising a bottom produced from a flat sheet of metal fashioned to provide a body and a restricted neck, a rim surrounding the edges of the body and the side edges of the neck and formed from an angle iron secured to the top face of the bottom, that portion of the rim extending across the rear edge of the neck having an upstanding flange of slightly greater height than the upstanding flange of the balance of the rim, plates secured to the rim at the sides of the neck with the forward ends projecting outwardly a short distance around the rear edges of the pan body, strengthening strips disposed on the outside of said plates adjacent their rear edges, runners disposed on the underside of the bottom and formed from angle irons with the flanges which contact the bottom being turned inwardly toward each other and the downwardly projecting flanges being inclined upwardly from their rear toward their forward ends and ribs also formed from angle irons and disposed on the under face of the bottom between the runners and between the side edges of the body and said runners.

CESARE FANFARILLO.